(12) United States Patent
Druyan (10) Patent No.: US 9,016,529 B2
(45) Date of Patent: Apr. 28, 2015

(54) CONTAINER FOR DISPENSING LIQUID DOSES

(76) Inventor: Eugene Druyan, Ontario (CA)

( * ) Notice: Subject to any disclaimer, the term of this patent is extended or adjusted under 35 U.S.C. 154(b) by 49 days.

(21) Appl. No.: 13/821,141

(22) PCT Filed: Aug. 30, 2011

(86) PCT No.: PCT/CA2011/000970
§ 371 (c)(1),
(2), (4) Date: Mar. 6, 2013

(87) PCT Pub. No.: WO2012/031349
PCT Pub. Date: Mar. 15, 2012

(65) Prior Publication Data
US 2013/0168418 A1 Jul. 4, 2013

Related U.S. Application Data

(60) Provisional application No. 61/380,294, filed on Sep. 6, 2010.

(51) Int. Cl.
*B67D 3/00* (2006.01)
*A47G 19/22* (2006.01)
*G01F 11/26* (2006.01)

(52) U.S. Cl.
CPC .......... *B67D 3/0041* (2013.01); *A47G 19/2266* (2013.01); *G01F 11/262* (2013.01)

(58) Field of Classification Search
CPC . B67D 3/0041; A47G 19/2266; G01F 11/262
USPC ............. 222/424.5, 434, 438, 454, 134, 163, 222/282, 306, 308
See application file for complete search history.

(56) References Cited

U.S. PATENT DOCUMENTS

| 267,296 | A |   | 11/1882 | Wilder |   |
|---|---|---|---|---|---|
| 874,757 | A | * | 12/1907 | Fox | 222/308 |
| 1,053,169 | A | * | 2/1913 | Gillespie | 222/304 |
| 1,098,524 | A | * | 6/1914 | Palmer | 222/184 |
| 1,270,262 | A |   | 6/1918 | Buckland |   |
| 1,935,150 | A | * | 11/1933 | Linders et al. | 184/7.4 |
| 1,952,558 | A |   | 3/1934 | Miller |   |
| 1,982,917 | A | * | 12/1934 | Lothrop et al. | 222/153.09 |

(Continued)

FOREIGN PATENT DOCUMENTS

| AU | 2008303027 A1 | 4/2009 |
|---|---|---|
| CA | 2219618 A1 | 4/1998 |

(Continued)

*Primary Examiner* — Donnell Long
(74) *Attorney, Agent, or Firm* — Jansson Munger McKinley & Shape Ltd.

(57) ABSTRACT

The present invention relates to a container for dispensing a predetermined volume of liquid wherein the container comprises: a liquid deposit chamber having an open first end and an opposing closed second end, a nonconcentric liquid withdrawal chamber having a open first end and an opposing closed second end, one or more apertures between said deposit and withdrawal chambers adapted to selectively permit liquid communication in controlled doses from the liquid deposit chamber to the liquid withdrawal chamber, a liquid stabilization chamber surrounding the liquid withdrawal chamber, and a base cap having a nonconcentric cavity in axial alignment with the liquid stabilization chamber and in liquid communication with the liquid deposit and withdrawal chambers.

15 Claims, 11 Drawing Sheets

(56) References Cited

U.S. PATENT DOCUMENTS

| | | | |
|---|---|---|---|
| 2,373,551 A | 4/1945 | De Ladder | |
| 2,693,301 A | 11/1954 | Allen, Jr. | |
| 2,820,577 A * | 1/1958 | Winters et al. | 222/306 |
| 2,989,216 A * | 6/1961 | Moro-Lin | 222/207 |
| 3,091,368 A * | 5/1963 | Harley et al. | 222/56 |
| 3,172,580 A | 3/1965 | Mackey | |
| 3,224,652 A | 12/1965 | Ladwig et al. | |
| 3,412,892 A | 11/1968 | Waksman et al. | |
| 4,083,146 A | 4/1978 | Brankovic | |
| 4,235,348 A | 11/1980 | Watson | |
| 4,424,921 A | 1/1984 | Feuerstein et al. | |
| 4,438,865 A | 3/1984 | Scatteregia | |
| 4,614,285 A * | 9/1986 | Fudalla et al. | 222/454 |
| 4,828,149 A | 5/1989 | Hester | |
| 4,921,112 A | 5/1990 | Juhlin et al. | |
| 5,018,636 A | 5/1991 | Ross | |
| 5,067,637 A | 11/1991 | Aurness et al. | |
| 5,102,000 A | 4/1992 | Feltman, III | |
| 5,150,816 A | 9/1992 | DeCastro | |
| 5,249,703 A | 10/1993 | Karp | |
| 5,323,928 A | 6/1994 | Stevens | |
| 5,405,055 A | 4/1995 | Hester | |
| 5,454,470 A | 10/1995 | Bricker | |
| 5,497,916 A | 3/1996 | Hester | |
| 5,570,797 A | 11/1996 | Yeh | |
| 5,579,946 A | 12/1996 | Rowan et al. | |
| 5,823,380 A | 10/1998 | Cox | |
| 5,964,379 A | 10/1999 | DeMars | |
| 6,076,699 A | 6/2000 | Seager et al. | |
| 6,161,720 A | 12/2000 | Castle | |
| 6,471,085 B1 | 10/2002 | Gallo | |
| 6,520,369 B1 | 2/2003 | Cytacki | |
| 6,568,557 B2 | 5/2003 | Fusco et al. | |
| 6,571,973 B1 | 6/2003 | Tripsianes | |
| 6,755,318 B2 | 6/2004 | Burke et al. | |
| 6,783,020 B2 | 8/2004 | Featherston et al. | |
| 7,032,788 B2 | 4/2006 | Moreau et al. | |
| 7,080,752 B2 | 7/2006 | Bergeron | |
| 7,290,684 B1 | 11/2007 | Ellion | |
| 7,946,126 B2 | 5/2011 | Blankman et al. | |
| 8,371,470 B2 | 2/2013 | Druyan | |
| 2005/0178775 A1 | 8/2005 | Burke et al. | |
| 2007/0181604 A1 * | 8/2007 | Rusch | 222/306 |
| 2008/0203048 A1 * | 8/2008 | Baylous et al. | 215/3 |
| 2008/0264960 A1 | 10/2008 | Phillips et al. | |

FOREIGN PATENT DOCUMENTS

| | | |
|---|---|---|
| CA | 2311058 A1 | 12/2000 |
| CA | 2386384 A1 | 4/2001 |
| CA | 2425200 A1 | 4/2002 |
| CA | 2428592 A1 | 5/2002 |
| CA | 2700396 A1 | 4/2009 |
| EP | 61164 A2 * | 9/1982 |
| EP | 2212211 A1 | 8/2010 |
| JP | S4111032 Y1 | 5/1966 |
| JP | S55107655 A | 8/1980 |
| JP | S646261 U | 1/1989 |
| JP | H1053265 A | 2/1998 |
| JP | 2010540361 A | 12/2010 |
| WO | WO 2009/039632 | 4/2009 |
| WO | 2012031349 A1 | 3/2012 |

* cited by examiner

CONTAINER FOR DISPENSING LIQUID DOSES

RELATED APPLICATIONS

This application claims the benefit of U.S. Provisional Patent Application Ser. No. 61/380,294, filed Sep. 6, 2010 and is a 35 USC §371 national stage application of PCT International Application No. PCT/CA2011/000970, filed Aug. 30, 2011. Each patent application identified above is incorporated herein by reference in its entirety to provide continuity of disclosure.

FIELD OF THE INVENTION

The present invention relates to a container or cup for dispensing a precise, predetermined amount of liquid to a user.

BACKGROUND OF THE INVENTION

A spill resistant container is highly desirable in applications where there is an increased probability of spillage during drinking, such as in hospitals and nursing homes with debilitated patients, training cups for children, and in moving vehicles such as airplanes, boats, ships, trains and automobiles.

Volume dosing is also desirable in containers for hot beverages. A hot beverage, such as coffee, consumed at a temperature of greater than 80 degree Celsius has the potential to scald or otherwise damage the mouth and lips of a consumer. Solutions to this problem have included stirring the beverage or waiting for thermal radiation to decrease the beverage temperature to a comfortable level to allow consumption. Additionally, ice or a cooler consumable liquid such as water or milk is added to decrease the beverage temperature. Unfortunately, upon cooling a beverage to a comfortable consumption temperature, the beverage temperature quickly decreases until a hot beverage is below the optimal consumption temperature.

A similar situation exists with cold beverages that have the potential to irritate sensitive dental structures or chill portions of the digestive tract to cause temporary cramps or pain.

A volume dosing container is also desirable for a user having difficulty in swallowing, which is referred to as dysphagia. There are currently millions of people diagnosed with dysphagia. A patient suffering from dysphagia may encounter medical complications, such as aspiration. Sometimes, when liquids enter the windpipe of a person who has dysphagia, coughing or throat clearing cannot remove it. Liquid that stays in the windpipe may enter the lungs and create a chance for harmful bacteria to grow. A serious infection (aspiration pneumonia) can result. Dysphagia patients are therefore often put on restricted diets and asked to take small sips of liquid to prevent aspiration into their lungs.

For many dysphagia patients the preferable method of liquid consumption is drinking a predetermined volume of liquid using a dispensing tube or a straw.

Volume dosing is also used for dispensing medication in liquid form. Liquid medication is commonly consumed using a dosing measuring device, such as, a spoon, a syringe, or a measuring cap or cup. The foregoing devices are prone to incorrect measurement because the medication is commonly required to be poured into the dosing device to a marked level on the device. Dosing measuring devices may also be inconvenient to use, such as when a person is on a plane, in a car, or at a public place. This inconvenience can result in a missed medication dose, which may affect the medication's effectiveness. Incorrect measurement will also arise when alternate devices such as an ordinary teaspoon or tablespoon are used in place of a dosing device. In addition, the elderly and persons with limited manual dexterity have trouble dealing with dosing measuring devices.

The foregoing types of dosing devices may be sufficient for some dosing liquid medications where the accuracy of the dose volume is not critical, but are unsatisfactory for accurate volume dosing.

The container disclosed in WO2009/039632A1 permits dispensing a predetermined volume of liquid without the use of valves, pumps or springs. Although the described container permits a predetermined dose, additional small portions of liquid may be unintentionally delivered into the withdrawal chamber when the container is sporadically inclined from one side to another or is shaken. While the unintentional over delivery of small portions of liquid may not be important for containers used as a child's training cup, or as a temperature moderated cup, it can be important for containers used by persons suffering from a swallowing disorder (Dysphagia), or for liquid medication delivery containers. Also, some of the embodiments of the spill-resistant container disclosed in WO2009/039632A1 deliver liquid when the container is in an upright position but not when the container is in an inclined position.

The spill resistant container of the present invention is capable of delivering repeat, predetermined doses of the liquid from an upright position while minimizing accidental or over delivery of additional small volumes of liquid when the container is inclined or shaken.

SUMMARY OF THE INVENTION

The present invention advantageously provides a spill resistant container for dispensing predetermined liquid doses that is of relatively simple and inexpensive construction as compared to devices of similar functionality of the prior art.

The invention relates to a container for dispensing a predetermined volume of liquid. The container has a liquid deposit chamber having a closed top end and an open bottom end and an inner liquid withdrawal chamber in nested relationship with the liquid deposit chamber. The withdrawal chamber has an open top end, and a bottom end which forms a dosing chamber. An aperture in the withdrawal chamber permits air to flow from the withdrawal chamber into the deposit chamber and an aperture in the withdrawal chamber permits liquid to flow from the deposit chamber into the withdrawal chamber. The air flow aperture is located in a side wall of the withdrawal chamber. A stabilization chamber surrounds the dosing chamber. A base cap seals the bottom end of the liquid deposit chamber. The base cap has a cavity in axial alignment with the stabilization chamber. The cavity permits liquid to pass between the liquid deposit and withdrawal chambers.

In a further aspect the dosing chamber has a closed bottom end.

In a further aspect, the air flow aperture and the liquid flow aperture are the same aperture in a side wall of the dosing chamber. When the container is inverted into a fill position, filled with liquid, and subsequently returned to the upright position, air flows from the dosing chamber into the deposit chamber through the aperture and liquid flows from the deposit chamber into the dosing chamber through the aperture until the liquid level in the dosing chamber prevents air flow into the deposit chamber.

In a further aspect, the dosing chamber has regulating means for setting a predetermined dosage volume.

In a further aspect, the means for regulating dosage volume is comprised of a dosing chamber having a threaded open bottom end and a cooperating rotatable threaded plug.

In another aspect, the stabilization chamber is comprised of a spaced wall surrounding an outer portion of the dosing chamber. The wall has a vertically positioned slit oriented opposite the air aperture.

In a further aspect, the dosing chamber extends below the open end of the liquid deposit chamber.

In a further aspect, the liquid withdrawal chamber is in a nonconcentric nested relationship with the liquid deposit chamber.

In another aspect, the container has a u-shaped slot on the upper side of the container closest the liquid withdrawal chamber. The slot opens into the liquid withdrawal chamber.

In another aspect, the walls of the deposit chamber and the withdrawal chamber comprise a vacuum space or other thermal insulation.

In another aspect, the walls of the withdrawal chamber are comprised of high thermal conductive materials and the walls of the deposit chamber are comprised of low thermal conductive materials.

In a further aspect, the container is provided with a replaceable lid for sealing the opening of the container opening and sealing the dosing chamber above the air aperture.

In a further aspect, the base cap detachably seals the bottom end of the liquid deposit chamber.

In a further aspect, the predetermined volume dispensed by the container is between 3 ml and 50 ml.

In another aspect, a predetermined volume of a liquid is dispensed from the container using a dispensing straw. A dispensing straw is inserted into the dosing chamber, the container is inclined about twenty degrees from its vertical axis, such that the liquid flow aperture is positioned above the liquid level in the dosing chamber. A predetermined volume of liquid is withdrawn from the dosing chamber through the straw.

Other advantages, features and characteristics of the present invention, as well as methods of operation and functions of the related elements of the structure, and the combination of parts and economies of manufacture, will become apparent upon consideration of the following detailed description and the appended claims with reference to the accompanying drawings, the latter of which are briefly described hereinafter.

BRIEF DESCRIPTION OF THE DRAWINGS

The present invention may be further understood by reference to the description of the invention, taken in conjunction with the accompanying drawings, in which.

DETAILED DESCRIPTION OF THE INVENTION

The description, which follows, and the embodiments described therein, is provided by way of illustration of an example, or examples of particular embodiments of principles and aspects of the present invention. These examples are provided for the purposes of explanation, and not of limitation, of those principles and of the invention.

Referring to FIGS. 1, 2, 3, and 6 a container or cup 10, shown in a first or upright position, includes a bopdy 20 of generally hollow form about a vertical axis with an open top end 30 and open bottom end 40 and a base cap 50 which sealingly engages with body 20.

The body 20 includes an outer wall 80 and an inner wall 90. The inner wall 90 is shown having a cylindrical shape but may equally be generally frusto-conical or cone shaped. The inner wall 90 is positioned within outer wall 80 such that inner wall 90 adjoins outer wall 80 at top edge regions 100a and 100b of the body 20 and at the opposing end forms a short, generally cylindrically shaped cup portion or dosing chamber 120 having a closed bottom end 110.

Outer wall 80 and inner wall 90 define a nonconcentric inner hollow space or liquid withdrawal chamber 160 (nonconcentric from the vertical axis of the body) and an outer hollow space or liquid deposit chamber 170. The inner chamber 160 has an open end 30 at the top of body 20 and a closed opposing end 110. The dosing chamber 120 extends axially beyond outer wall 80.

Dosing chamber 120 has a first aperture 130 in the side wall 90 of dosing chamber 120 in air or liquid communication with cavity 60 and a second spaced apart aperture 140 on the side wall 90 of dosing chamber 120. Apertures 140 and 130 are shown as circular but may have other forms, for example be slits. The first aperture 130 may be optionally located on the bottom end 110 or on the inner side wall 90 of the dosing chamber 120 or be combined with the second aperture 140. In any configuration, the apertures are dimensioned generally according to the surface tensions of the liquids for which the container may be directed. The outer chamber 170 has an open end 40 at the bottom end of body 20 and is closed at the outer top edge regions 100a and 100b of the body 20. The outer chamber 170 is in air or liquid communication with aperture 140.

The volume of a single liquid dose is predetermined by the volume of dosing chamber 120 and the relative position of second aperture 140 on the side wall of dosing chamber 120. The liquid dose volume will be less if aperture 140 is positioned closer to bottom dosing chamber wall 110. For dysphagia applications, the dose volume is typically 3 ml. to 15 ml. For travel container applications and other applications, the dose volume is typically 20 ml. to 50 ml.

The inner chamber 160 is nonconcentric with respect to outer chamber 170. Accordingly, liquid deposited into outer chamber 170 is positioned towards one side of outer chamber 170. This configuration assures that when a user drinks through open first end 30 by tilting container 10, aperture 140 will always be above the upper level of liquid. If inner chamber 160 were concentric with outer chamber 170, tilting or shaking container 10 when the aperture 140 is below and aperture 130 is above the upper level of liquid, could cause air from dosing chamber 120 through aperture 130 and into cavity 60, thereby resulting in accidental liquid delivery into inner chamber 160 through aperture 140. Such accidental liquid delivery would result in over delivery of liquid, which may be undesirable for some uses such as liquid medication requiring a precise dosage volume.

Referring to FIGS. 2, 3, 4, 5, 7, and 9 to 11, a spaced wall 200 concentrically surrounds an outer portion of dosing chamber 120. The upper end of the wall 200 is attached to inner side wall 90 and the opposing lower end of wall 200 is open. The wall 200 as shown is in the shape of a hollow cylinder but it may be in the form of other geometric shapes, including square or rectangular. A vertically positioned slit 210 on wall 200 is oriented opposite aperture 140. The space between wall 200 and dosing chamber 120 forms a stabilization chamber 220.

Figure 6:
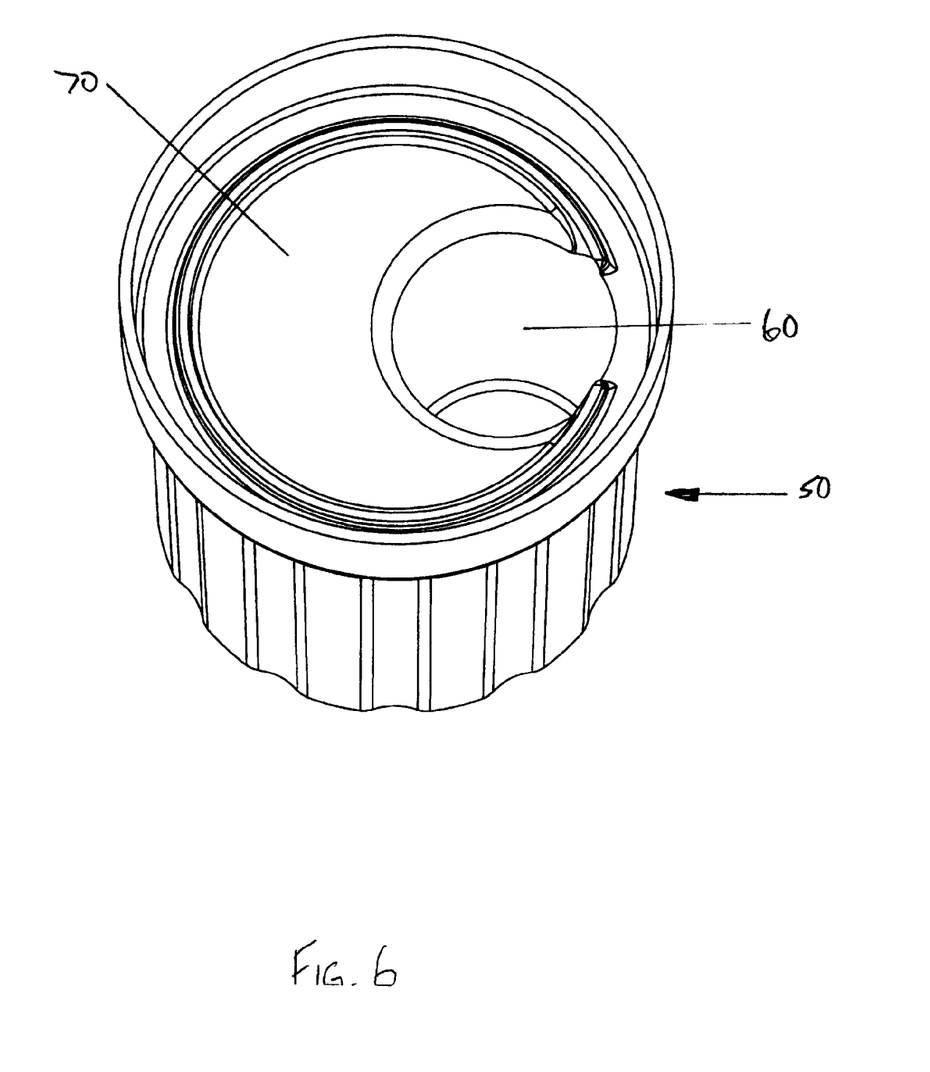
FIG. 6 is a partially exploded perspective view of the base cap of the container of FIG. 1.
Figure 7:
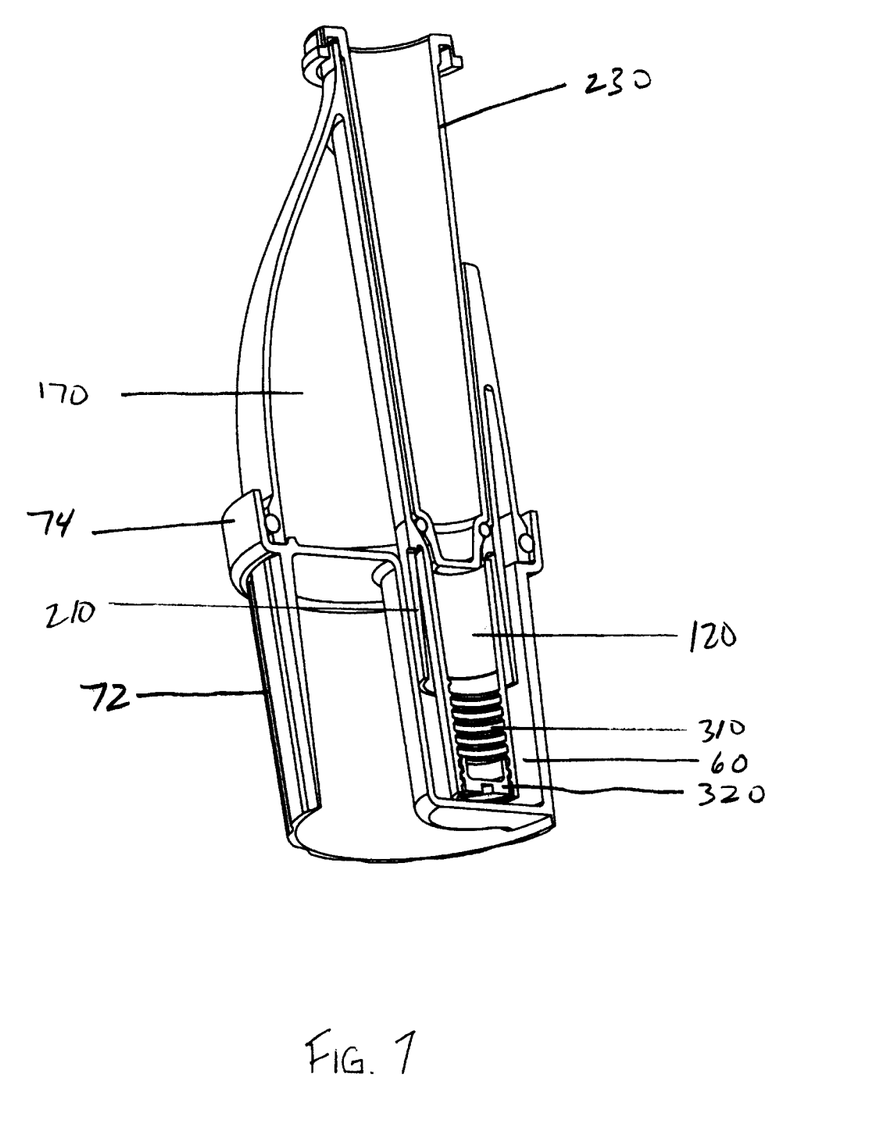
FIG. 7 is a partially exploded perspective in cross section of another embodiment of the container.
Figure 8:
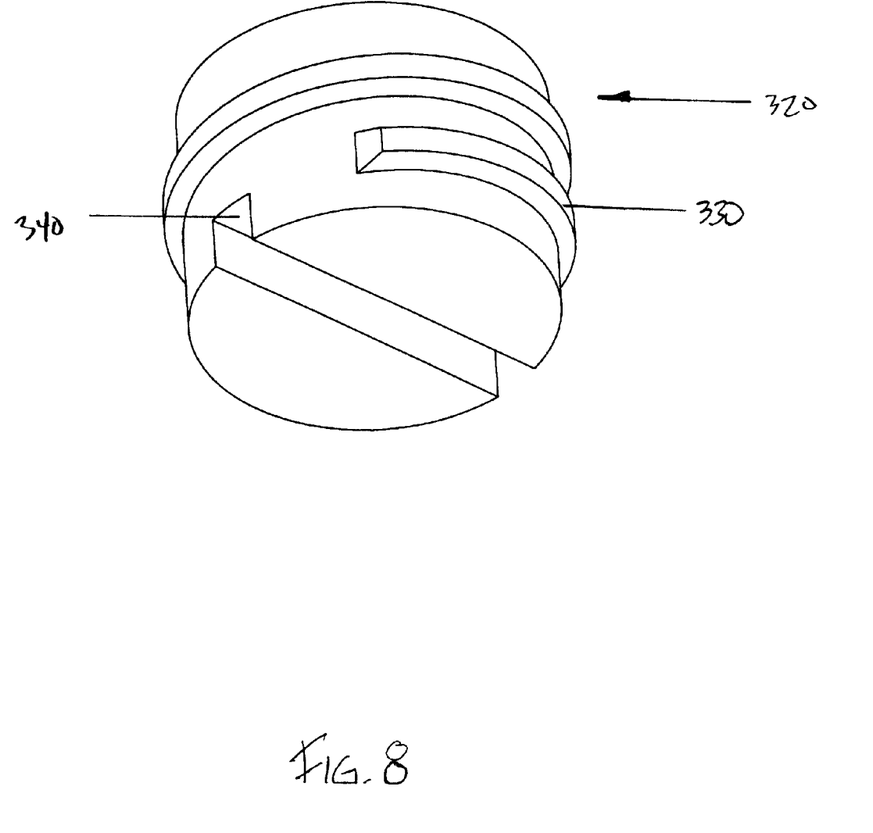
FIG. 8 is a partially exploded perspective view of an externally threaded dosing chamber regulating plug.
Figure 9:
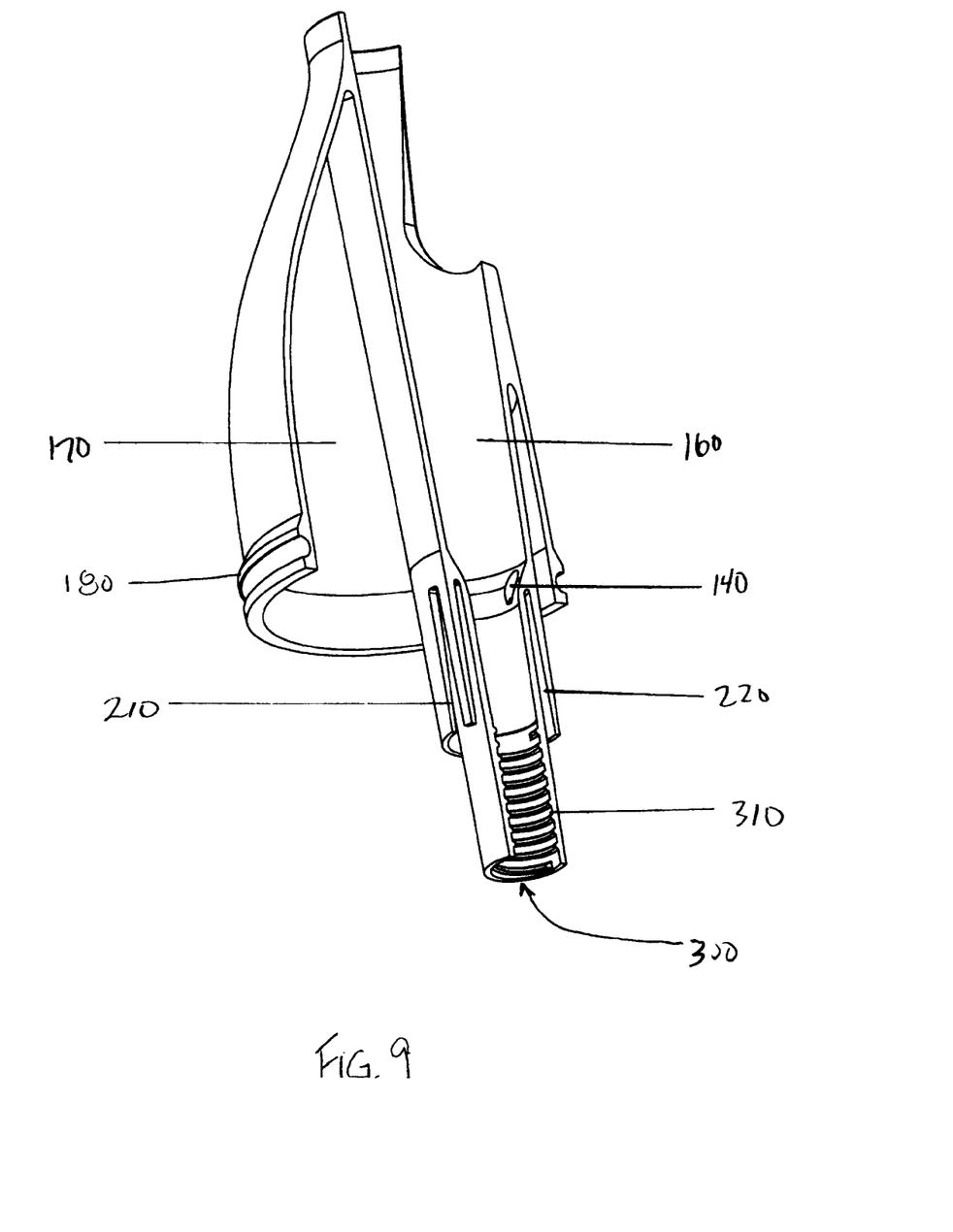
FIG. 9 is a partially exploded perspective view with cross-section of the body of the container shown in FIG. 7, without the lid.
Figure 10:
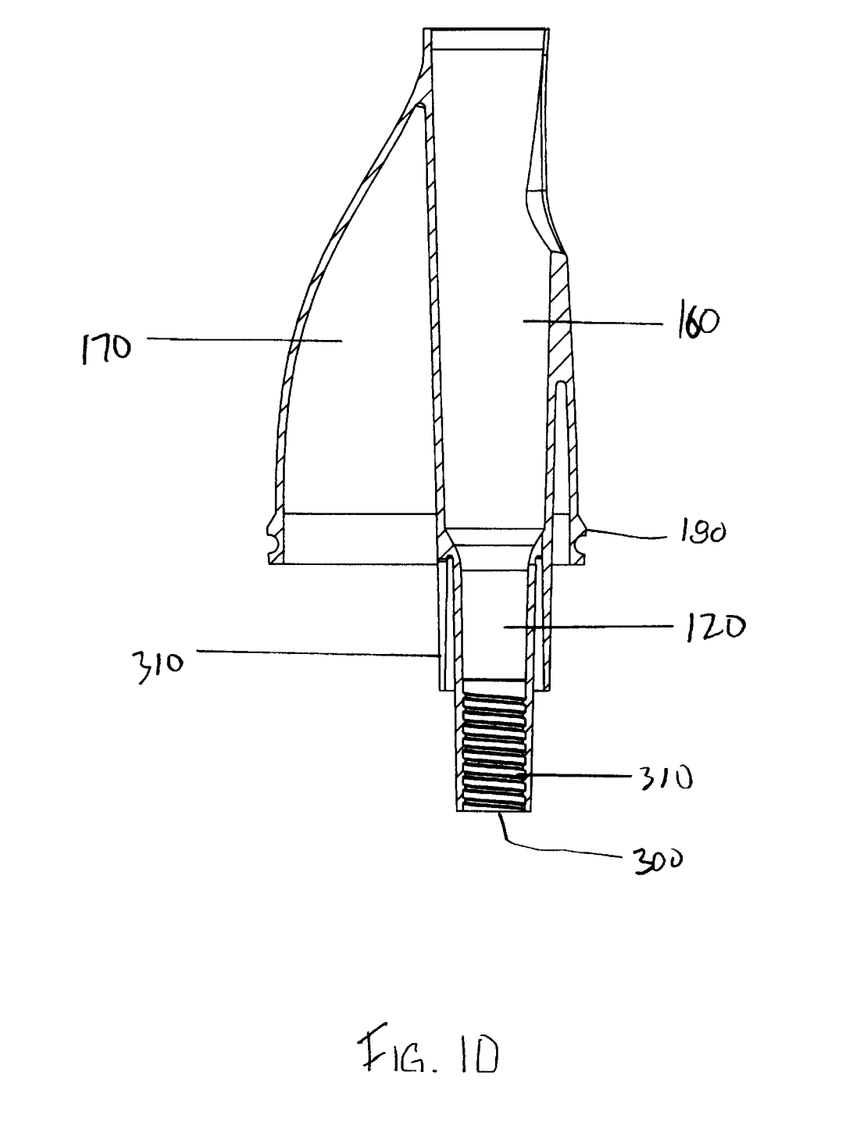
FIG. 10 is a cross section of the body of the container shown in FIG. 11.
Figure 11:
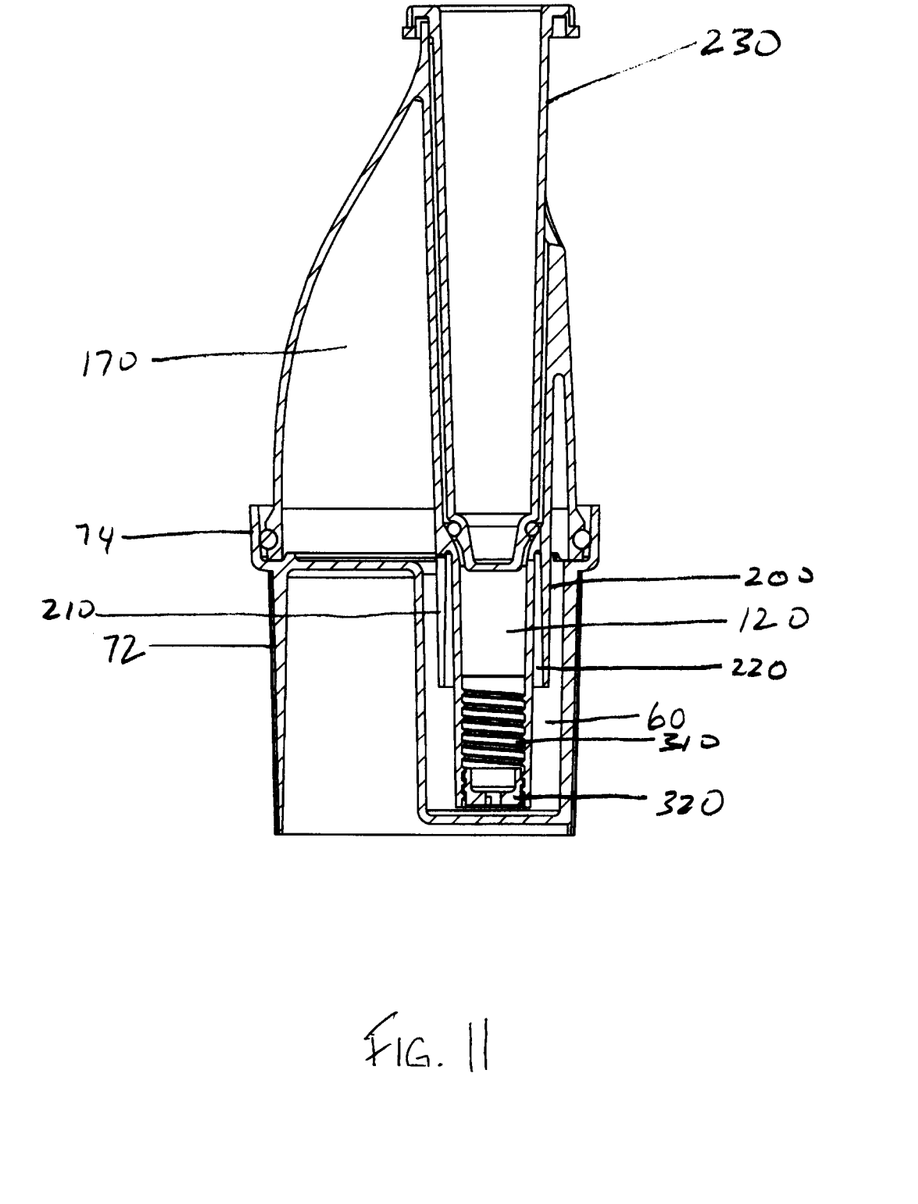
FIG. 11 is a cross-section view of the embodiment shown in FIG. 7.

The base cap 50 is comprised of a top surface 70, a peripheral wall 72 extending downwardly from top surface 70, a nonconcentric cavity 60 extending downwardly from the top surface 70 (nonconcentric from the vertical axis of body), and an upright flange 74. The cavity 60 may equally be configured in other shapes which surround the stabilization chamber wall 200 and dosing chamber 120. The top surface 70 of the base cap 60 is on plane above or at the same level as aperture 140. The position of aperture 140 versus the bottom end wall 110 defines the size of a liquid dose. Accordingly, for accurate dosing, liquid must always be above aperture 140. This geometry of the base cap 50 assures that when the majority of liquid is consumed, only a very small amount of liquid may remain and thus be wasted.

The outer wall 80 in the area directly adjacent open end 40 includes external screw threads 180. Screw threads 180 are connectable with internal screw threads 190 formed on the base cap 50. An O-ring 290 may be used for sealing between the base cap 50 and the body 20. Engagement of base cap 50 to body 20 may be by threaded arrangement as shown, by friction fit (not shown), or other known manner of sealing engagement.

In operation, base cap 50 is disengaged from body 20 and body 20 is rotated 180 degrees from the upright position to an inverted position so that open end 40 of outer chamber 170 becomes an interim top opening of body 20. Liquid or fluid is poured into outer chamber 170 to any desired level up to the edge of open end 40 and base cap 50 is reattached to body 20. The nonconcentric cavity 60 in base cap 50 is in axial alignment with wall 200 and dosing chamber 120. Cavity 60 is larger in cross section than wall 200.

As container 10 is returned to the upright position air from inner withdrawal chamber 160 enters stabilization chamber 220 through aperture 140 and then into outer chamber 170 through the slit 210. The entering air causes liquid in outer chamber 170 to flow through aperture 130 into dosing chamber 120 until liquid in dosing chamber 120 reaches the level that prevents air entering into aperture 140. Once air cannot enter into aperture 140, no further air enters into stabilization chamber 220, no further air enters into chamber 170, and no further liquid flows into dosing chamber 120. The amount of liquid in dosing chamber 120 represents a predetermined, controlled dose of liquid that the user may drink through open first end 30 by tilting container 10.

Additional controlled doses of liquid equal to the first dose are obtainable by withdrawing liquid from inner chamber 160 by tilting the container and drinking from open end 30 or without tilting via use of a straw, followed by rotation of container 10 to the first position. Such process results in another equal dose of liquid for further consumption by the user. Controlled precise dosing is repeatable until no liquid remains in outer chamber 170.

The container of the present invention prevents accidental delivery of additional liquid into dosing chamber 120. When dosing chamber 120 contains a liquid dose and container 10 is inclined by a user there are three possibilities depending on the direction the cup 10 is inclined: (a) liquid covers aperture 140 and air cannot enter stabilization chamber 220 and air cannot enter into outer chamber 170; therefore further liquid cannot enter into dosing chamber 120; (b) liquid covers slit 210 and air cannot enter into outer chamber 170 and liquid cannot enter into dosing chamber 120; (c) liquid stays on the same level (container is not inclined) and air cannot enter into stabilization chamber 220 and air cannot enter into outer chamber 170; liquid cannot enter into dosing chamber 120. Accordingly, liquid only enters into dosing chamber 120 when the container 10 is in the upright position, thereby preventing accidental liquid delivery into the dosing chamber when container 10 is shaken or inclined. The amount of liquid in dosing chamber 120 represents a predetermined, controlled dose of liquid that a user may drink through open first end 30 by tilting container 10.

As shown, for example in FIGS. 1, 2, 7 and 11, a lid 230 (shown as an elongated generally cylindrical structure) may be optionally used to close the container 10 and preserve the liquid dose in the dosing chamber 120, such as when the container 10 is transported. The bottom end 240 of lid 230 extends below the aperture 140. An O-ring 280 near the bottom end of lid 230 seals dosing chamber 120 and thereby prevents leakage of liquid from it.

Figure 1:
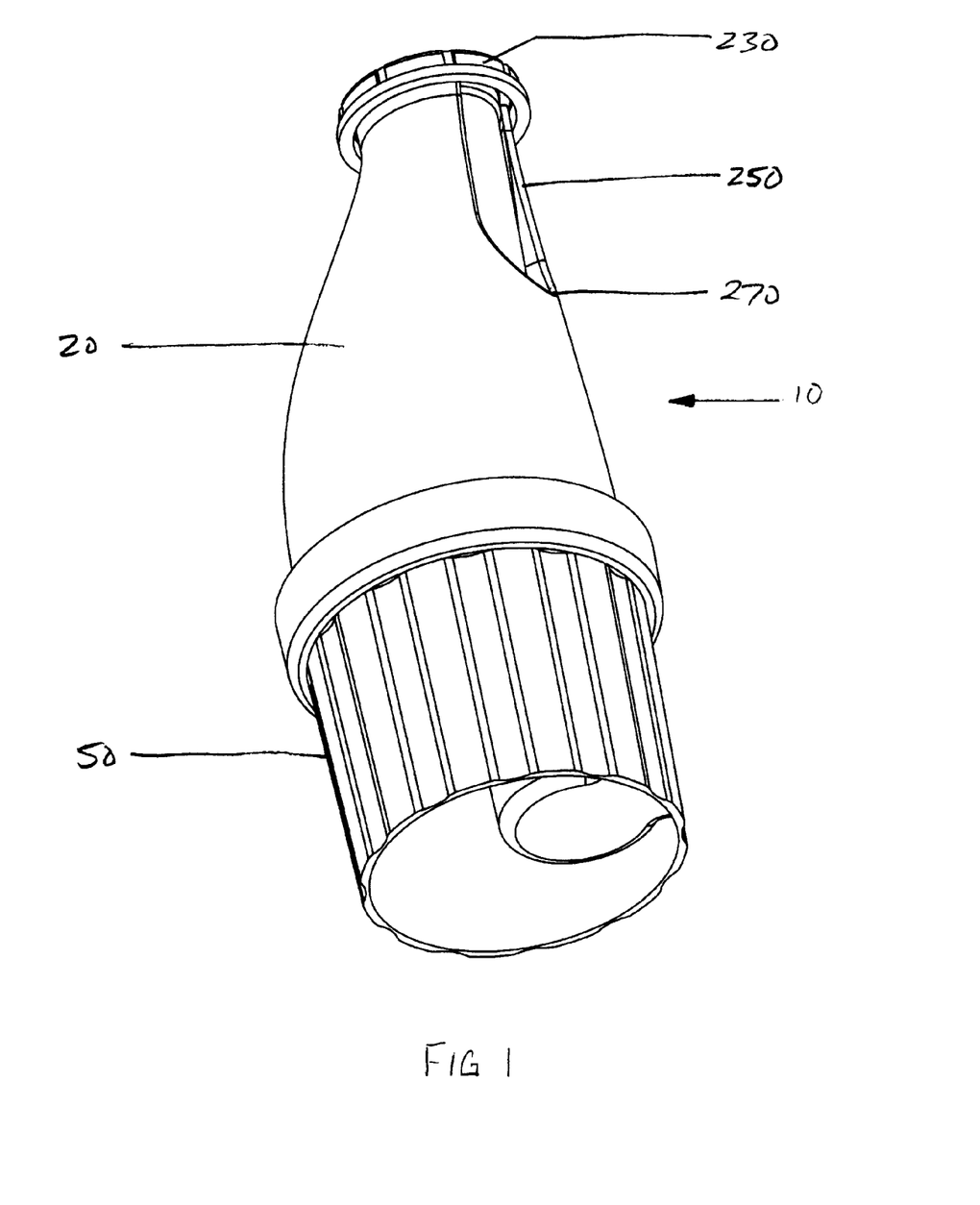
FIG. 1 is a perspective view of a container according to an embodiment of the invention.
Figure 2:
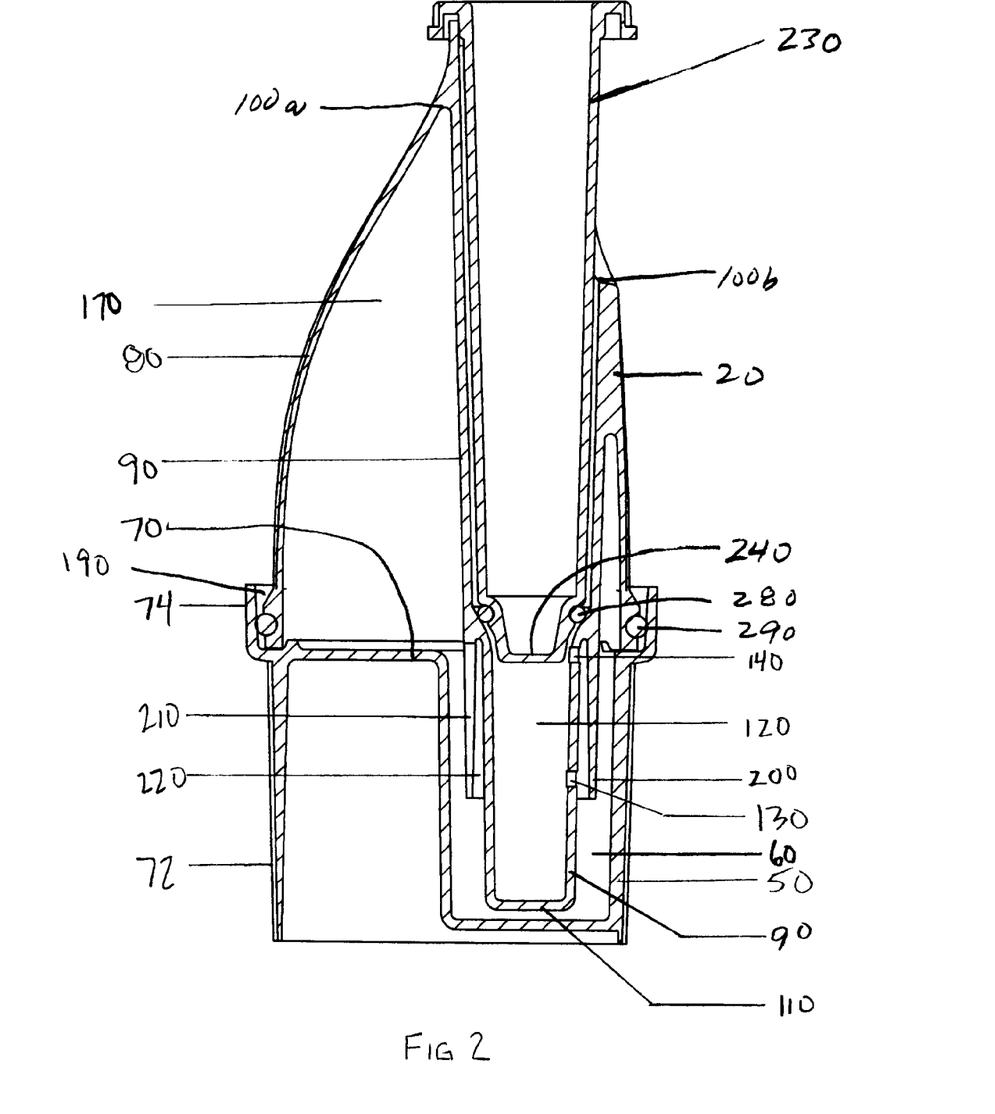
FIG. 2 is a cross-sectional view of a container according to the embodiment shown in FIG. 1
Figure 3:
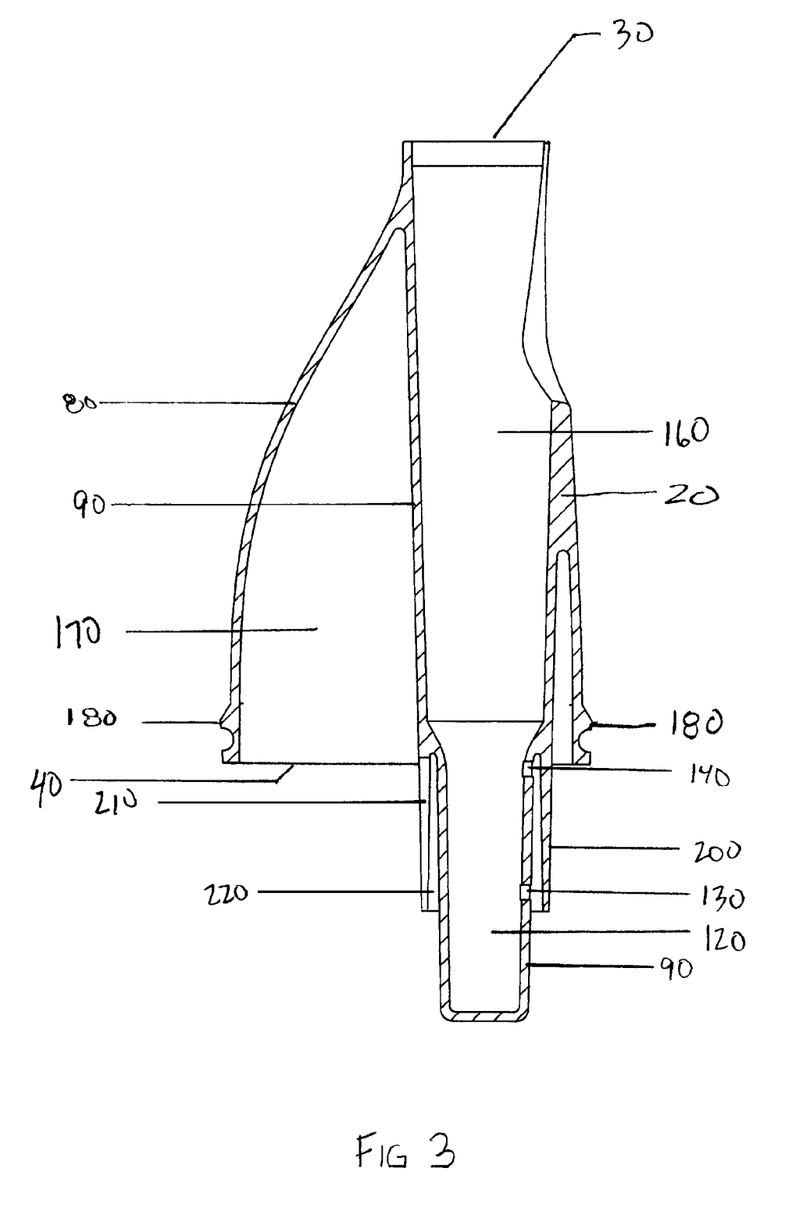
FIG. 3 is a cross-sectional view of the body of a container according to the embodiment shown in FIG. 1 (without the lid and without the base cap).
Figure 4:
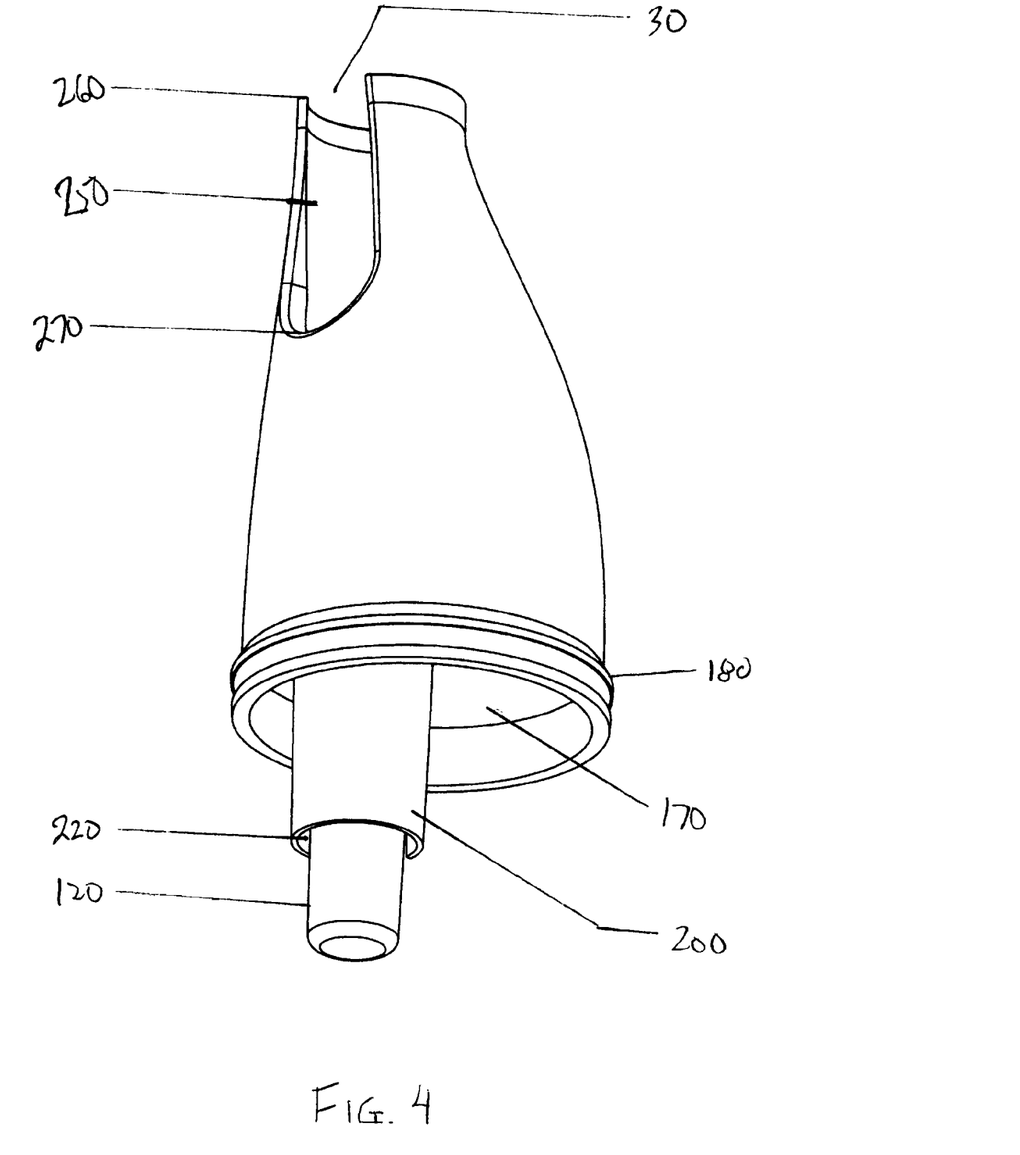
FIG. 4 is a partially exploded perspective view of the body of the container of FIG. 1.
Figure 5:
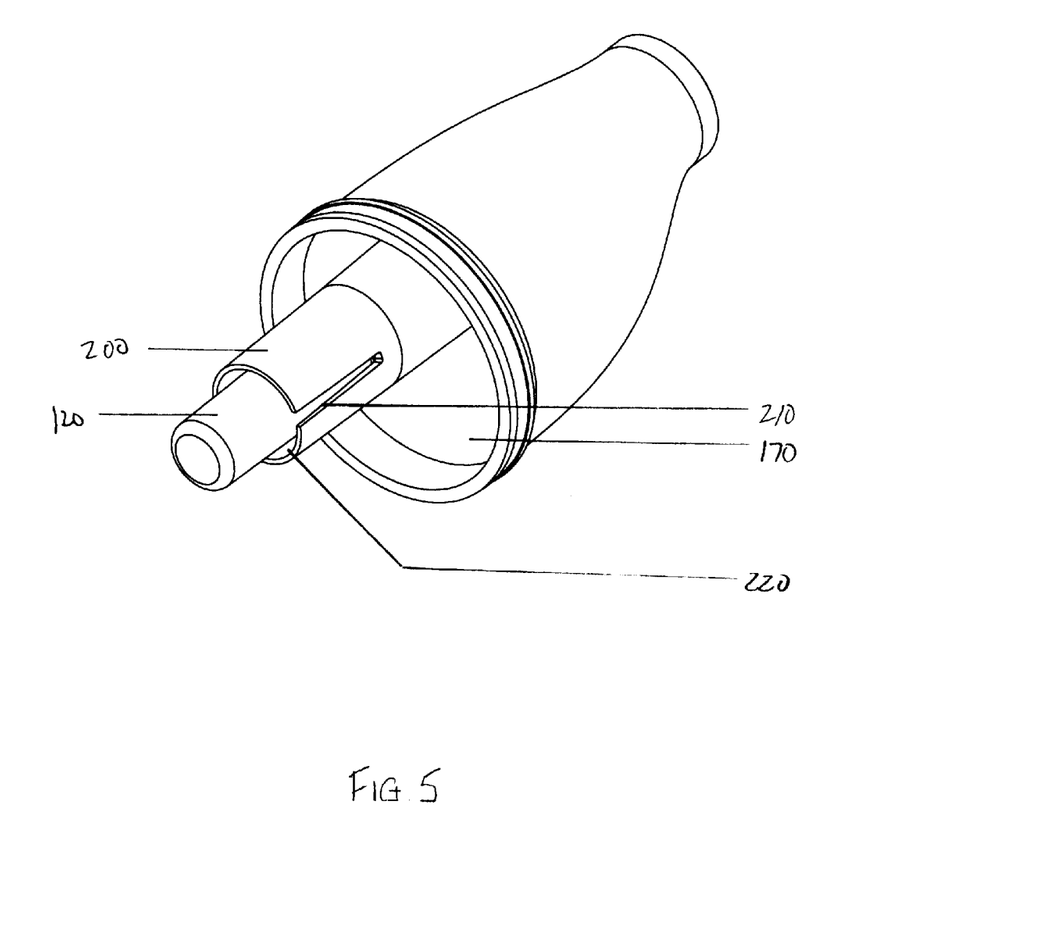
FIG. 5 is a partially exploded perspective view of the body of the container of FIG. 1.

Referring, for example to FIGS. 1 and 4, one upper side of the body 20 of container 10 has a substantially wide slit opening 250 into chamber 160 with an upper open end 260 and a lower closed end 270. The slit 250 resides on the same side of the body 20 as the dosing chamber 120. This geometry forces a user to drink from only one side of open end 30 of the body 20, namely the side that is opposite to slit 250. Further, in the case of dysphagia patients, the user may insert their nose into slit opening 250 when withdrawing the liquid dose.

In some applications, such as when container 10 is disposable, body 20 and base cap 50 can be manufactured as a unitary unit or permanently sealed during the manufacturing process to form a unitary unit. Liquid may be deposited into outer chamber 170 through apertures 130 and/or 140 under pressure or through a valve (not shown) which can be located in top surface 70 of base cap 50.

FIGS. 7 to 11 show a further embodiment wherein the liquid volume dose may be regulated or adjusted by the user. The liquid dosing chamber 120 has open lower end 300 and internal threads 310. A plug or regulator 320 having external threads 330 is adapted to threadingly engage liquid dosing chamber 120. Regulator 320 optionally has a slit 340 for receiving a driving device such as a screwdriver. Rotation of regulator 320 moves it within the dosing chamber 120. The amount of liquid in dosing chamber 120 can thus be pre-set or adjusted by rotating regulator 320.

A typical construction of the container and its elements of the present invention would normally be a rigid plastic material but other materials may be equally suitable for different applications. The container may be constructed of ceramic, porcelain, glass, metal, clay, paper, or combinations thereof.

Container 10 may optionally be constructed of thermal insulating materials or have vacuum walls (not shown) to maintain the contained liquid at a desired temperature (either hot or cold). For example, referring to FIG. 3, parts of the wall in the liquid withdrawal chamber which are exposed to the atmosphere may optionally be constructed of high thermal conductive materials, while internal to deposit chamber wall 90 and external wall 80 of the deposit chamber may be constructed of low thermal conductive materials. Such combination of high thermal conductive materials and low thermal conductive materials can increase the intensity of the thermo moderation process of the liquid in the dosing chamber, while preserving the hot or cold temperature of main volume of liquid.

The container may also optionally have one or more external handles mounted or pre-formed on the external body wall.

It is to be understood by one of ordinary skill in the art that the present discussion is a description of exemplary embodiments only, and is not intended to limit the broader aspects of the present invention.

The embodiments of the invention in which an exclusive property or privilege is claimed are defined as follows:

1. A container for dispensing a predetermined volume of liquid comprising, when the container is in an upright position:
    a liquid deposit chamber having a closed top end and an open bottom end;
    an inner liquid withdrawal chamber in nested relationship with the liquid deposit chamber, said withdrawal chamber having an open top end, and a bottom end forming a dosing chamber;
    an aperture in the withdrawal chamber for air to flow from the withdrawal chamber into the deposit chamber;
    an aperture in the withdrawal chamber for liquid to flow from the deposit chamber into the withdrawal chamber;
    wherein said air flow aperture is located in a side wall of the withdrawal chamber;
    a stabilization chamber surrounding the dosing chamber; and
    a base cap that seals the bottom end of the liquid deposit chamber, the base cap having a cavity in axial alignment with the stabilization chamber and wherein in operation said cavity permits liquid to pass between the liquid deposit and withdrawal chambers.

2. The container of claim 1 wherein said dosing chamber has a closed bottom end.

3. The container of claim 1, wherein said air flow aperture and said liquid flow aperture are the same aperture in a side wall of the dosing chamber, wherein when the container is inverted into a fill position, filled with liquid, and subsequently returned to the upright position, air flows from the dosing chamber into the deposit chamber through the aperture and liquid flows from the deposit chamber into the dosing chamber through the aperture until the liquid level in the dosing chamber prevents air flow into the deposit chamber.

4. The container of claim 1 wherein said dosing chamber comprises regulating means for setting a predetermined dosage volume.

5. The container of claim 4 wherein the means for regulating dosage volume is comprised of a dosing chamber having a threaded open bottom end and a cooperating rotatable threaded plug.

6. The container of claim 1, wherein the stabilization chamber is comprised of a spaced wall surrounding an outer portion of the dosing chamber, said wall having a vertically positioned slit oriented opposite the air aperture.

7. The container of claim 1, wherein the dosing chamber extends below the open end of the liquid deposit chamber.

8. The container of claim 1, wherein the liquid withdrawal chamber is in a nonconcentric nested relationship with the liquid deposit chamber.

9. The container of claim 8 further comprising a u-shaped slot on the upper side of the container closest the liquid withdrawal chamber, said slot opening into the liquid withdrawal chamber.

10. The container of claim 1, wherein the walls of the deposit chamber and the withdrawal chamber comprise a vacuum space or other thermal insulation.

11. The container of claim 10, wherein the walls of the withdrawal chamber are comprised of high thermal conductive materials and the walls of the deposit chamber are comprised of low thermal conductive materials.

12. The container of claim 1, further comprising a removable lid for sealing the open top end of the container and sealing the dosing chamber above the air aperture.

13. The container of claim 1, wherein the base cap detachably seals the bottom end of the liquid deposit chamber.

14. The container of claim 1 wherein the predetermined volume dispensed by the container is between 3 ml and 50 ml.

15. A method for dispensing a predetermined volume of a liquid using a container according to claim 1 and a dispensing straw comprising:
    inserting a dispensing straw into the dosing chamber;
    inclining the container about twenty degrees from its vertical axis, such that the liquid flow aperture is positioned above the liquid level in the dosing chamber; and
    withdrawing the predetermined volume of liquid from the dosing chamber through the straw.

* * * * *